United States Patent Office 2,890,766
Patented June 16, 1959

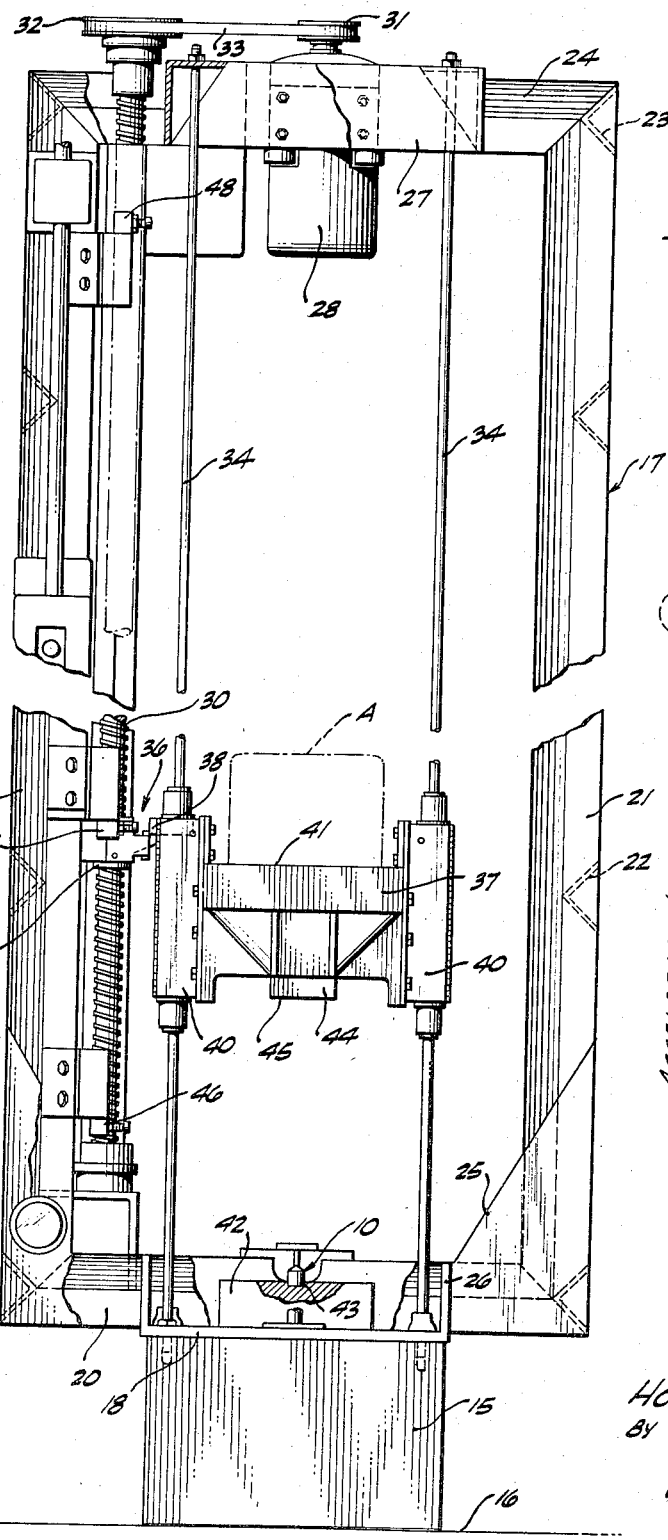

2,890,766

SHOCK ABSORBING STRUCTURE

Homer I. Sargeant, Anaheim, Calif., assignor to Hughes Aircraft Company, Culver City, Calif., a corporation of Delaware Original application October 1, 1956, Serial No. 614,778, now Patent No. 2,846,869, dated August 12, 1958. Divided and this application February 25, 1958, Serial No. 717,516

3 Claims. (Cl. 188—1)

The present invention relates generally to a shock absorbing apparatus that is adapted for use in connection with a shock impulse testing apparatus and relates particularly to a deformable pellet article for use with a drop tower to impart a saw-tooth shaped shock wave to articles, proper testing of which requires such handling.

The invention hereof is a division of an application of John R. Gray, Homer I. Sargeant and Vernal M. Tyler, Serial Number 614,778, filed October 1, 1956, now Patent Number 2,846,869 and entitled Shock Impulse Testing Apparatus.

Many devices such as, for example, electronic structures, articles and components, must in use be subjected to considerable shock. In order that such items may be reliable while in service, it is necessary to ascertain whether or not these articles will withstand certain maximum shocks that are either equal to or in excess of like shocks produced in use.

Shock impulses such as those applied to electronic apparatus or delicate instrumentation by gun or rocket blasts, rough handling, dropping, etc., differ widely from accelerations which might be applied thereto by a centrifuge in that these normally encountered shock impulses excite considerable structural resonances. The response to the shock impulse within the structure varies from one point to another and is frequently several times the peak of applied acceleration. For this reason the more common methods of describing shock severities in terms of peak acceleration or rise time duration are inadequate.

In analyzing any shock severity it must be assumed that the vulnerable unit of hardware consists of structure that is mounted to a relatively rigid base plate or frame, that the acceleration-time function is known for the base plate or whatever the hardware may in turn be mounted to, and that any damage to the unit is due entirely to this motion. It has been demonstrated that with such precautions, the shock spectrum, which consists essentially of the peak responses of a reed gage, is valuable for describing and comparing the severities of such shocks even when the structure under test has either damped or multiple resonances.

Shock spectra are computed for a number of simple pulse shapes. Thus, it is possible to specify shock tests in terms of the shock spectra, or in terms of simple pulses chosen to have a shock spectrum at least as severe at every frequency as that of the shock impulse to be simulated. A saw-tooth type shock wave is one of these simple pulse shapes and the device of this invention easily provides this form of shock impulse.

Heretofore many attempts have been made toward the provision of means by which a saw-tooth shock impulse may be derived by either rapidly accelerating or rapidly decelerating an object to be tested. These prior attempts have included drop test towers utilizing materials or substances to be engaged by a platform after a fall from a predetermined height. These materials or substances have taken the form of sand, rubber, materials such as sand or metallic particles encased in a flexible enclosure, hydraulic rams, solid metallic materials, plastics and the like. However, each of these heretofore known structures produce a type of shock wave that is either square, sinusoidal or otherwise formed and usually include many random vibrations inducing unwanted and unnecessary shock to the article being tested. Furthermore, prior devices and equipment have been of such a nature as to prevent use by relatively unskilled operators under production conditions and necessitated review by highly skilled analysts in setting up for a shock impulse test and/or reading the final results thereof.

It is accordingly one important object of the present invention to provide a shock absorbing structure for use with a shock impulse testing apparatus.

It is another object of the invention to provide a shock absorbing structure that will produce a saw-tooth shaped shock wave for application to an article to be tested and when engaged by a moving platform carrying the object being tested.

Briefly, the device of this invention comprises a pellet of a permanently deformable material that is of a particular shape and size and which is adapted to be engaged by a guided platform that is dropped from a predetermined height. Deformation of this pellet serves to decelerate the platform at such a rate as to produce a saw-tooth shaped shock wave, there being few, if any, random shocks or vibrations resulting from any rebound or resilient characteristics of the material of the pellet. This device is set forth and described in the following specification and accompanying drawing, wherein:

Figure 1 is a side elevational view of the pellet forming the shock impulse absorbing apparatus of the present invention;

Fig. 2 is a front elevational view of a drop tower with which the present pellet may be employed and with portions broken away for clarity; and Fig. 3 is a graph illustrating a saw-tooth shape of the shock impulse produced when the present pellet is used with an apparatus of the type shown in Fig. 2.

With reference to the drawing, and with reference primarily to Fig. 1, the pellet of this invention is shown as indicated generally at 10 and is formed in an integral unitary manner having a cylindrical body portion 11, a flat bottom 12 that is normal to the axis of the cylindrical body 11, and a conical upper portion 13 which terminates in an axially located point 14. The pellet 10 is preferably made from a nonresilient, permanently deformable material such as, for example, lead or a like material. It has been found that a particular type of lead such as is commonly known as corroding or pig lead provides the desired results. In the manufacture of these lead pellets, they are poured at a melt temperature of approximately 850° F. into a preheated mold and, when the pellets are solidified, they are removed from the mold and cooled by quenching in water. The finished pellets are therefore uniform and homogeneous. Additionally, the finished pellets are stored in such a manner as to prevent any deformation from the original configuration, or creation of nicks or blemishes thereon. For this purpose, a tray having pellet holding compartments has been found to be satisfactory.

As shown in Fig. 2 of the drawing, a drop tower may be employed with the present apparatus and includes a heavy base structure 15 that is positioned on a suitable surface 16. A tower frame structure, indicated generally at 17, is mounted on the base 15. The frame structure 17 includes a horizontally disposed base plate member 18 having a pair of laterally extending V-shaped cross members 20 secured thereto. The base plate member 18 also serves to support bars of vertically extending V-shaped tower members 21 that are braced by means of transverse members 22 and which are joined at upper ends thereof by means of lateral cross members 23 and longitudinal cross members 24. The lower portions of the tower structure 17 are further braced by means of triangular webs 25 and angle bracing 26. The generally rectangular frame thus produced is adapted to support the desired mechanism and provide a rigid enclosure therefor.

The cross members 24 serve to support a bracket 27 which in turn carries an electric motor 28. The electric motor is adapted to drive an elongated, vertically disposed screw 30 through pulleys 31 and 32 and a belt 33. The bracket 27 also serves to support upper ends of a pair of guide rods 34, the lower ends of which are attached to the base plate member 18.

The screw 30 has a follower nut 35 positioned thereabout which carries a latch mechanism 36, this mechanism being adapted for engagement with a platform 37 having a latch engaging boss 38. The platform 37 is provided with elongated bearing structures 40 on opposite sides thereof which receive and are guided by the rods 34. The platform 37 is also provided with an upper surface 41 to which an article to be tested, and indicated at A, is connected.

As shown in Fig. 2, the base plate member 18 is adapted to support a block 42 in the central area thereof, the block 42 having a centrally disposed recess 43 in which the deformable pellet 10 is adapted to be positioned. The recess 43 serves to position the pellet in vertical alignment with a strike member 44 having a lower surface 45 and carried by the lower portion of the platform supporting structure 37.

As set forth in the before-mentioned referenced patent, the present drop tower is also provided with a plurality of roller actuated switches 46, 47 and 48, that are carried along edges of the vertical frame members 21 and positioned for engagement by a portion of the latch mechanism 36. Additionally, suitable electrical controls are provided whereby to energize the motor 28 and to interconnect the motor with the switches 46, 47 and 48. A latch release mechanism (not shown) is also carried by the frame structure 17 to release the latch mechanism 36 when the platform 37 is raised to a predetermined height.

In operation of the drop tower shown in Fig. 2, the motor 28 is first energized, whereby to drive the screw 30 and, through the nut 35, raise the platform 37 to a height determined by the position of the latch release mechanism above the switch 47, whereupon the latch 36 will operate to disengage the platform therefrom to permit free fall of the platform 37 for engagement of the surface 45 of the strike 44 with the pellet 10. The pellet 10 will be deformed to the configuration shown generally by the dotted lines in Fig. 1 and a saw-tooth shock wave impulse of the type illustrated in Fig. 3, will be induced to the article A being tested. The particular shape and characteristic of the pellet 10 serves to produce this shock wave impulse of the type illustrated in Fig. 3.

Following engagement of the strike 44 with the pellet 10, the switch 48 will be engaged by the latch mechanism 36 to effect reversal of the motor 28, whereupon the nut 35 will travel downwardly, reengaging the boss 38 and engaging the switch 46, whereby again to lift the platform 37 until engagement with the switch 47.

With specific reference to Fig. 3, the saw-tooth shape of the shock wave imparted by this device is clearly evident, with the acceleration-time factors and height of the pulse being determined by the distance of downward travel of the platform 37, which distance is determined by the position of the mechanism for release of the latch 36. Plastic deformation of the pellet 10 serves rapidly to stop downward movement of the platform 37 without rebound or other extraneous shock impulses being applied to the article A being tested.

It may thus be seen that the device of this invention is relatively simple and may be utilized in production situations for the shock testing of various articles. The particular proportional size of the pellet 10 is a matter of choice and depends largely upon the magnitude of the shock wave form desired in connection with the deceleration of the platform 37 and the article A carried thereby.

Having thus described the invention and the present embodiment thereof, it is desired to emphasize the fact that slightly modified forms of the present pellet may be resorted to in accomplishing the present testing regime and in a manner limited only by a just interpretation of the following claims.

I claim:
1. A shock absorbing device for use with a drop testing apparatus and adapted for engagement by an article carrying platform to produce a saw-tooth shaped shock wave impulse to such article comprising: a solid elongated body of a nonresilient, permanently deformable material, said body having at least a partial conical configuration; an apex on said body; and a planar end on said body remote from said apex.

2. A shock absorbing device according to claim 1 wherein said material is lead.

3. A shock absorbing device according to claim 2 wherein said body is generally cylindrical and said conical configuration is confined to an end portion of said body.

References Cited in the file of this patent

UNITED STATES PATENTS 2,732,040   De Vost et al. _____ Jan. 24, 1956